United States Patent
Baker

[15] 3,692,783
[45] Sept. 19, 1972

[54] CERTAIN 2-BENZIMIDAZOLE CARBAMATES AND THEIR UTILITY

[72] Inventor: Don R. Baker, Orinda, Calif.

[73] Assignee: Stauffer Chemical Company, New York, N.Y.

[22] Filed: Sept. 25, 1970

[21] Appl. No.: 75,753

[52] U.S. Cl...............260/240 J, 424/273, 260/309.2
[51] Int. Cl. .............................................C07d 49/38
[58] Field of Search.........................260/240 J, 309.2

[56] References Cited
UNITED STATES PATENTS
3,541,213   11/1970   Klopping...................424/273

Primary Examiner—John D. Randolph
Attorney—Daniel C. Block, Edwin H. Baker, Albert J. Adamcik and Harry A. Pacini

[57] ABSTRACT

New compounds corresponding to the formula

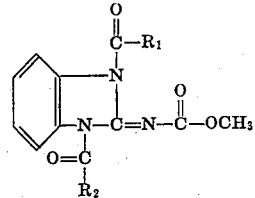

wherein $R_1$ and $R_2$ can be the same or different and are selected from alkyl, aryl, haloalkyl, cycloalkyl, alkenylaryl, and furanyl. The compositions described herein are useful as fungicides and biocides.

3 Claims, No Drawings

CERTAIN 2-BENZIMIDAZOLE CARBAMATES AND THEIR UTILITY

DESCRIPTION OF THE INVENTION

The present invention is concerned with a novel group of compounds which can be generally described as 2-benzimidazole carbamates, and their use as pesticides, especially effective against fungi and parasites.

The compounds are represented by the general formula

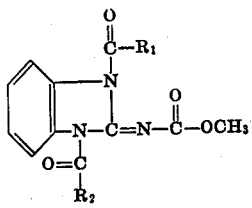

wherein $R_1$ and $R_2$ can be the same or different and can be selected from alkyl, aryl, haloalkyl, cycloalkyl, alkenylaryl, and furanyl.

The compounds represented by the above general formula are manufactured by reacting a 2-benzimidazole alkyl carbamate in an inert solvent with an acid chloride or other like material in the presence of an acid acceptor. The inert solvent can be selected from benzene, chloroform, or the like. The acid acceptor can be selected from triethylamine, pyridine, or the like. In order to illustrate the merits of the present invention, the following examples are provided.

EXAMPLE I

Preparation of

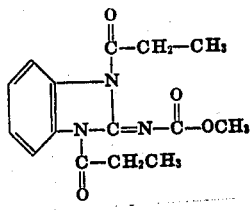

A mixture of 9.6 grams (0.05 moles) of 2-benzimidazole methyl carbamate, 100 ml. of chloroform and 10.5 ml. (0.12 moles) of propionyl chloride was prepared. Then, 16.8 ml. of triethylamine in 30 ml. of chloroform was added to the mixture with stirring over a period of 1 hour and 40 minutes at 22°–26 C. The mixture was stirred for 30 minutes and then washed with 100 ml. of water, dried over MgSO$_4$ and evaporated in vacuo to yield an oil that crystallized from ethyl ether to yield 10.2 grams of solid with m.p. of 103°–105° C.

EXAMPLE II

Preparation of

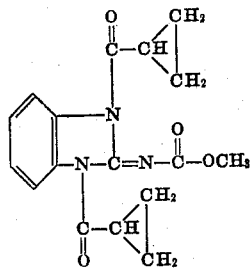

A mixture of 9.6 grams (0.05 moles) of 2-benzimidazole methyl carbamate, 100 ml. of chloroform and 12.5 grams cyclopropane carboxylic acid chloride was formed. Then, 17 ml. of triethylamine was added dropwise with stirring over a period of 30 minutes at 18°–20° C. and the mixture stirred at room temperature for 18 hours. The solution was washed with 100 ml. water, dried over MgSO$_4$ and evaporated in vacuo to yield an oil that crystallized from cold ethyl ether to yield 13 grams of crystals after air drying. M.p. 108°–109° C.

EXAMPLE III

Other compounds were prepared in an analogous manner starting with the appropriate starting materials, as outlined above. The following is a table of compounds representative of those embodied by the present invention. Compound numbers have been assigned to them and are used for identification throughout the balance of the specification.

TABLE 1

| Compound No. | $R_1$ | $R_2$ |
|---|---|---|
| 1 | furanyl | furanyl |
| 2 | phenyl | phenyl |
| 3 | $-CH=CH-$phenyl | $-CH=CH-$phenyl |
| 4 | $C_2H_5$ | $C_2H_5$ |
| 5 | $CH_2CH_2Cl$ | $CH_2CH_2Cl$ |
| 6 | cyclopropyl | cyclopropyl |
| 7 | $CH_3$ | $CH_3$ |

FUNGICIDE TESTING PROCEDURES

A. Foliar Preventative Sprays

1. Bean Rust

The chemicals are dissolved in an appropriate solvent and diluted with water containing several drops of Tween–20, a wetting agent. Test concentrations, ranging from 1000 ppm downward, are sprayed to runoff on the primary leaves of pinto beans (*Phaseolus vulgaris* L.). After the leaves are dried, they are inoculated with a water suspension of spores of the bean rust fungus (*Uromyces phaseoli Arthur*) and the plants are placed in an environment of 100 percent humidity for 24 hours. The plants are then removed from the humidity chamber and held until disease pustules appear on the leaves. Effectiveness is recorded as percent reduction in number of pustules as compared to untreated inoculated plants.

2. Bean Powdery Mildew

Test chemicals are prepared and applied in the same manner as for the bean rust test. After the plants are dry, the leaves are dusted with spores of the powdery mildew fungus (*Erysiphe polygoni* De Candolle) and the plants are retained in the greenhouse until the fungal growth appears on the leaf surfaces. Effectiveness is recorded as percent of the leaf surface free of fungal growth as compared to untreated inoculated plants.

B. Tube Systemic Test

1. Bean Rust

The chemicals are dissolved in an appropriate solvent and diluted with tap water to a series of descending concentrations beginning at 50 ppm. Sixty ml. of each concentration are placed in a test tube. A pinto bean plant is placed in each tube and supported with a piece of cotton so that only the roots and lower stem are in contact with the test solution. Forty-eight hours later the bean leaves are inoculated with a water suspension of spores of the bean rust fungus and placed in an environment with 100 percent humidity for 24 hours. The plants are then removed from the humidity chamber and maintained in the greenhouse until the disease pustules appear on the leaves. Effectiveness is recorded as the lowest concentration, in ppm, which will provide 50 percent reduction in pustule formation as compared to untreated, inoculated plants.

2. Bean Powdery Mildew

Test chemicals are prepared and applied in the same manner as for the bean rust systemic test. After 2 days the leaves are dusted with spores of the powdery mildew fungus and maintained in the greenhouse until mycelial growth appears on the leaf surfaces. Effectiveness is recorded as the lowest concentration, in ppm, which will provide a 50 percent reduction in mycelial growth on the leaf surface as compared to untreated, inoculated plants.

BIOCIDE TESTING PROCEDURES

Tubes of sterilized nutrient and malt extract broth are prepared. Aliquots of the toxicant, dissolved in an appropriate solvent, are injected through the stopper, into the broth, to provide concentrations ranging from 50 ppm downward. The test organisms consist of two fungi, *Aspergillus niger* (A.n.) van Tieghem and *Penicillium italicum* (P.i.) Wehmer, and two bacteria, *Escherichia coli* (E.c.) Migula and *Staphylococcus aureus* (S.a.) Rosenbach. Three drops of a spore suspension of each of the fungi are injected into the tubes of malt broth and three drops of the bacteria are injected into the nutrient broth. One week later the growth of each organism is observed and effectiveness of the chemical is recorded as the lowest concentration in ppm which provides 50 percent inhibition of growth as compared to untreated inoculated tubes.

The results of the above tests are set forth in the following table.

TABLE II

| Compound Number | In vitro vial (p.p.m.) | | | | Preventative sprays, p.p.m. | | | | | | | | | Tube systemic, p.p.m. | |
| --- | --- | --- | --- | --- | --- | --- | --- | --- | --- | --- | --- | --- | --- | --- | --- |
| | | | | | Rust | | | Mildew | | | | | | | |
| | A.n. | P.i. | E.c. | S.a. | 1,000 | 500 | 100 | 1,000 | 500 | 100 | 50 | 25 | 10 | Rust | Mildew |
| 1 | 5 | 0.03 | >50 | >50 | 75 | 50 | 0 | 100 | 100 | 100 | 100 | 100 | 75 | 5 | 0.13 |
| 2 | 5 | 0.03 | >50 | >50 | 100 | 95 | 75 | 100 | 100 | 100 | 100 | 100 | 100 | 5 | 0.13 |
| 3 | 25 | 0.13 | >50 | >50 | 95 | 50 | 0 | 100 | 100 | 90 | | | | >50 | 1.00 |
| 4 | 1 | 0.02 | >50 | >50 | 100 | 100 | 80 | 100 | 100 | 100 | | | | 1 | 0.06 |
| 5 | 50 | 1.00 | >50 | >50 | | | | | | | | | | 25 | 5 |
| 6 | 5 | 0.06 | >50 | >50 | | | | | | | | | | 5 | 0.13 |
| 7 | 1 | 0.02 | >50 | >50 | | | | 100 | 100 | 100 | 100 | 100 | 85 | 1 | 0.06 |

What is claimed is:

1. A compounds corresponding to the generic formula

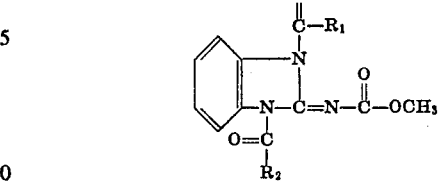

wherein $R_1$ and $R_2$ can be the same or different and are selected from styryl and furanyl.

2. The compound as set forth in claim 1 wherein $R_1$ and $R_2$ are furanyl.

3. The compound as set forth in claim 1 wherein $R_1$ and $R_2$ are styryl.

* * * * *